United States Patent [19]

Mizukata et al.

[11] Patent Number: 5,319,706
[45] Date of Patent: Jun. 7, 1994

[54] SYNCHRONIZING CIRCUIT

[75] Inventors: Katsuya Mizukata, Nara; Takafumi Kawaguchi, Tenri; Makoto Takeda, Nara; Hiroshi Take, Ikoma, all of Japan

[73] Assignee: Sharp Kabushiki Kaisha, Osaka, Japan

[21] Appl. No.: 753,902

[22] Filed: Sep. 3, 1991

[30] Foreign Application Priority Data

Sep. 5, 1990 [JP] Japan .................. 2-236474

[51] Int. Cl.⁵ .................. H04N 5/06; H04N 7/093
[52] U.S. Cl. .................. 380/5; 380/15; 360/60; 348/521; 348/533
[58] Field of Search .................. 380/5, 15; 358/150, 358/155; 360/60

[56] References Cited

U.S. PATENT DOCUMENTS

| | | | |
|---|---|---|---|
| 4,670,904 | 6/1987 | Rumreich | 380/15 |
| 4,672,440 | 6/1987 | Trahan | 380/15 |
| 4,695,901 | 9/1987 | Ryan | 380/5 |
| 4,817,142 | 3/1989 | van Rassel | 380/15 |
| 4,870,297 | 9/1989 | Karlock | 307/236 |

FOREIGN PATENT DOCUMENTS

| | | |
|---|---|---|
| 0186433 | 7/1986 | European Pat. Off. . |
| 0461897 | 12/1991 | European Pat. Off. . |
| 2652474 | 3/1991 | France . |
| 58-054792 | 9/1981 | Japan . |
| 58-0750977 | 7/1983 | Japan . |
| 63-166372 | 11/1988 | Japan . |
| 2238204 | 5/1991 | United Kingdom . |

Primary Examiner—Gilberto Barron, Jr.
Attorney, Agent, or Firm—Nixon & Vanderhye

[57] ABSTRACT

When a specific signal (such as copy guard signal) is added between horizontal synchronizing signals in a composite synchronizing signal, and the addition period of the specific signal is defined in a specific period on the basis of the vertical synchronizing signal, the composite synchronizing signal is masked to remove the specific signal, thereby obtaining a masked composite synchronizing signal. Afterwards, from the masked composite synchronizing signal, the horizontal synchronizing signal and vertical synchronizing signal are obtained. In the case of composite synchronizing signal containing noise, without masking, the horizontal synchronizing signal and vertical synchronizing signal are directly obtained from the composite synchronizing signal. Therefore, when noise is not present, the horizontal synchronizing signal and vertical synchronizing signal may be obtained without disturbing the video image.

7 Claims, 3 Drawing Sheets

SYNCHRONIZING CIRCUIT

BACKGROUND OF THE INVENTION

1. Field of the Invention

The present invention relates to a synchronizing circuit in a display or the like for obtaining a horizontal synchronizing signal and a vertical synchronizing signal from a composite synchronizing signal.

2. Description of the Prior Art

FIG. 1 is a block diagram showing a conventional synchronizing circuit designed to obtain a horizontal synchronizing signal and a vertical synchronizing signal from a composite synchronizing signal.

A phase locked loop (PLL) circuit 21 receives a composite synchronizing signal SYNa from a terminal TSYN. The PPL Circuit 21 generates both a clock CKa synchronized with the horizontal synchronizing component of the composite synchronizing signal SYNa, and a reset pulse RESa for resetting a counter 22 of a next stage.

The counter 22 is a circuit for generating a horizontal synchronizing signal HSa synchronized with the horizontal synchronizing component of the composite synchronizing signal SYNa and delivering to a terminal THS, by counting the clocks CKa as being reset by the reset pulse RESa.

A vertical synchronizing component separating circuit 23 receives the composite synchronizing signal SYNa from the terminal TSYN, and generates a pulse VSa synchronized with the vertical synchronizing component in the composite synchronizing signal SYNa.

A vertical synchronizing signal generating circuit 24 converts the pulse YSa generated in the vertical synchronizing component separating circuit 2S into a vertical synchronizing signal VHa synchronized with the horizontal synchronizing signal HSa generated in the counter 22, and delivers the signal VHa to the terminal TVH.

In the case of a composite synchronizing signal SYNa recorded in a video tape, a signal for prevention of copying (hereinafter called a copy guard signal) is sometimes added between signal synchronizing signals in the vertical blanking period. In the conventional synchronizing circuit as described above, to obtain the horizontal synchronizing signal HSa and vertical synchronizing signal VHa from such composite synchronizing signal SYNa, the clock CKa and reset pulse RESa generated in the PLL circuit 21 are disturbed by the copy guard signal. The horizontal synchronizing signal HSa generated in the counter 22 is also disturbed, and the picture cannot be displayed normally.

That is, the copy guard signal is standardized so as to be added from a specific period after the beginning of the vertical synchronizing signal till two horizontal periods before start of the video signal. But the disturbance of the horizontal synchronizing signal HSa due to this copy guard signal continues for several horizontal periods after start of video signal, and a picture disturbance appears in the upper part of the display image.

Because the PLL circuit 21 is used for matching the phase of the horizontal synchronizing signal HS (generated with the composite synchronizing signal SYNa), the horizontal synchronizing signal HSa is disturbed even after start of the video signal. More specifically, when the reaction speed of the PLL circuit 21 is slow, the disturbance of the horizontal synchronizing signal HSa continues for a longer period. If the reaction speed is too fast, other troubles occur, and it is otherwise impossible to avoid disturbance of the picture by adjusting the reaction speed of the PLL circuit 21.

SUMMARY OF THE INVENTION

A primary object of the invention to present a synchronizing circuit capable of obtaining a horizontal synchronizing signal and a vertical synchronizing signal which does not disturb the image from a composite synchronizing signal, even if a specific signal such as copy guard signal is added between horizontal synchronizing signals within the composite synchronizing signal.

To achieve the above object, the invention presents a synchronizing circuit for obtaining a horizontal synchronizing signal and a vertical synchronizing signal from a composite synchronizing signal comprising a mask circuit, a judging circuit, and a discriminative circuit.

The mask circuit masks the composite synchronizing signal and obtains a masked composite synchronizing signal removing a specific signal (the specific signal having been added between horizontal synchronizing signals in the composite synchronizing signal) and the addition period of this specific signal having been limited in a specific period by reference to the vertical synchronizing signal.

The judging circuit judges whether noise is contained in the composite synchronizing signal.

The discriminating circuit receives either the composite synchronizing signal (not passing through the mask circuit when it is judged that the noise signal is contained by the judging circuit) or the masked composite synchronizing signal (obtained from the mask circuit when it is judged that noise signal is not contained by the judging circuit), as the composite synchronizing signal (from which the horizontal synchronizing signal and vertical synchronizing signal are obtained).

Thus, according to the synchronizing circuit of the invention, when noise is not contained in the composite synchronizing signal, the masked composite synchronizing signal (being rid of specific signal such as copy guard signal through the mask circuit) is used. When noise is contained in the composite synchronizing signal, the composite synchronizing signal (not passing through the mask circuit) is used. The horizontal synchronizing signal and vertical synchronizing signal are obtained from the used signal. Therefore as far as the composite synchronizing signal is free from noise signal, even if the copy guard signal is added to the composite synchronizing signal, the horizontal synchronizing signal and a vertical synchronizing signal which does not disturb the image is obtained.

The invention is characterized in that the discriminating circuit comprises a PLL circuit and a first counter for generating a horizontal synchronizing signal, and a vertical synchronizing component separating circuit and a vertical synchronizing signal generating circuit for generating a vertical synchronizing signal.

The PLL circuit generates a clock synchronized with the horizontal synchronizing component and a reset pulse for resetting the first counter, on the basis of the input composite synchronizing signal.

The first counter counts the clocks, and generates a horizontal synchronizing signal and a first pulse for showing the time after the addition period of the specific signal.

The vertical synchronizing component separating circuit generates a second pulse synchronized with the vertical synchronizing component to the basis of the input composite synchronizing signal.

The vertical synchronizing signal generating circuit converts the second pulse into a vertical synchronizing signal synchronized with the horizontal synchronizing signal.

Also the invention is characterized in that the mask circuit comprises a second counter, a latch circuit, and a gate circuit.

The second counter counts the input composite synchronizing signals, being reset by the first pulse from the first counter, and delivers a third pulse which is changed in a period from the counting of 2 to 3.

The latch circuit delivers a fourth pulse which is changed in the period from rise of the third pulse to fall of the first pulse.

The gate circuit masks the composite synchronizing signal fed by the fourth pulse and delivers a masked composite synchronizing signal.

Furthermore, the invention is characterized in that the judging circuit comprises a third counter, a gate circuit, a noise judging circuit, a latch circuit, and an OR gate.

The third counter counts the horizontal synchronizing signals which are outputs from the first counter. The third counter delivers: (1) a fifth pulse (which is changed in the period from the counting 0 to 1); (2) a sixth pulse (which is changed in the period from the counting m of counting the first horizontal synchronizing signal of the horizontal synchronizing signals having the specific signal added in the meantime till the counting of n of counting the last horizontal synchronizing signal); and (3) a seventh pulse (which is changed in the period from the counting of n to n+1).

The gate circuit delivers the composite synchronizing signal as it is when the fifth pulse is fed in the low level period.

The noise judging circuit counts the outputs from the gate circuit, and delivers a pulse to indicate noise state when reaching a predetermined counting c.

The latch circuit delivers a pulse which is at high level in the period from fall of the output pulse from the noise judging circuit till fall of the seventh pulse from the third counter.

The OR gate circuit delivers an OR signal of the sixth pulse from the third counter and the pulse from the latch circuit.

Also the invention is characterized in that the discriminating circuit comprises a changeover circuit which receives the input composite synchronizing signal and the masked composite synchronizing signal from the mask circuit, and selects the masked composite synchronizing signal or the input composite synchronizing signal on the basis of the OR signal from the OR gate circuit, and applies to the PLL circuit.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
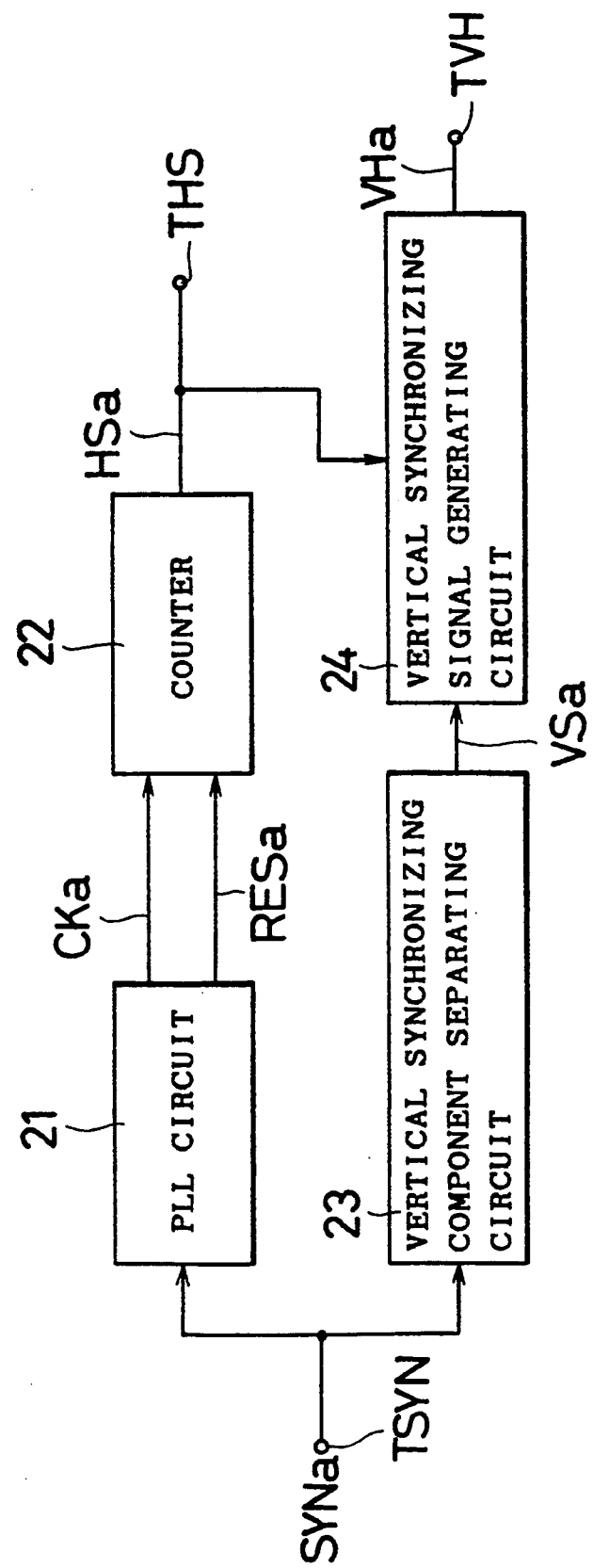
FIG. 1 is a block diagram showing a conventional synchronizing circuit.

Now referring to the drawings, preferred embodiments of the invention are described below.

Figure 2:
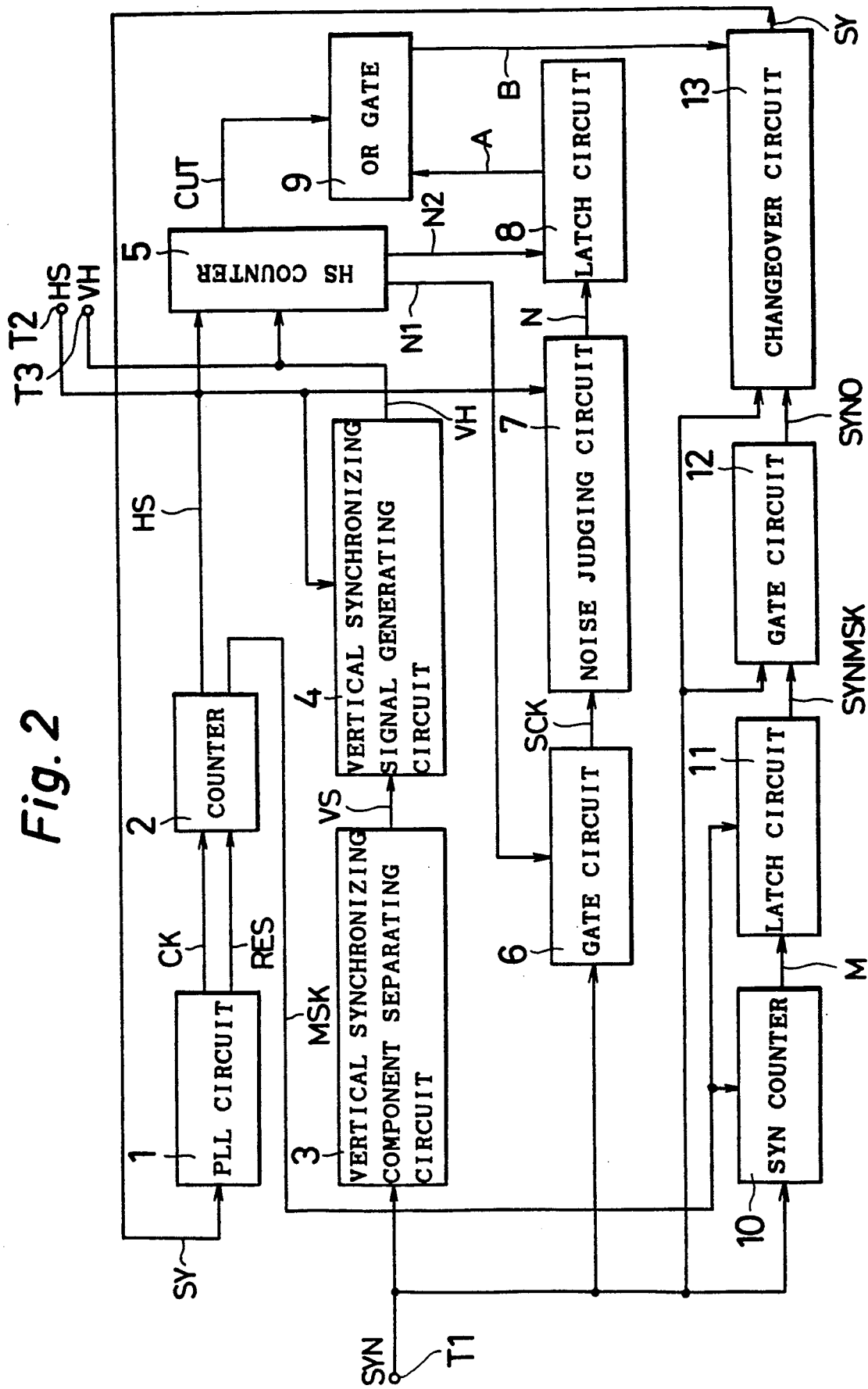
FIG. 2 is a block diagram showing a synchronizing circuit of an embodiment of the invention.
Figure 3:
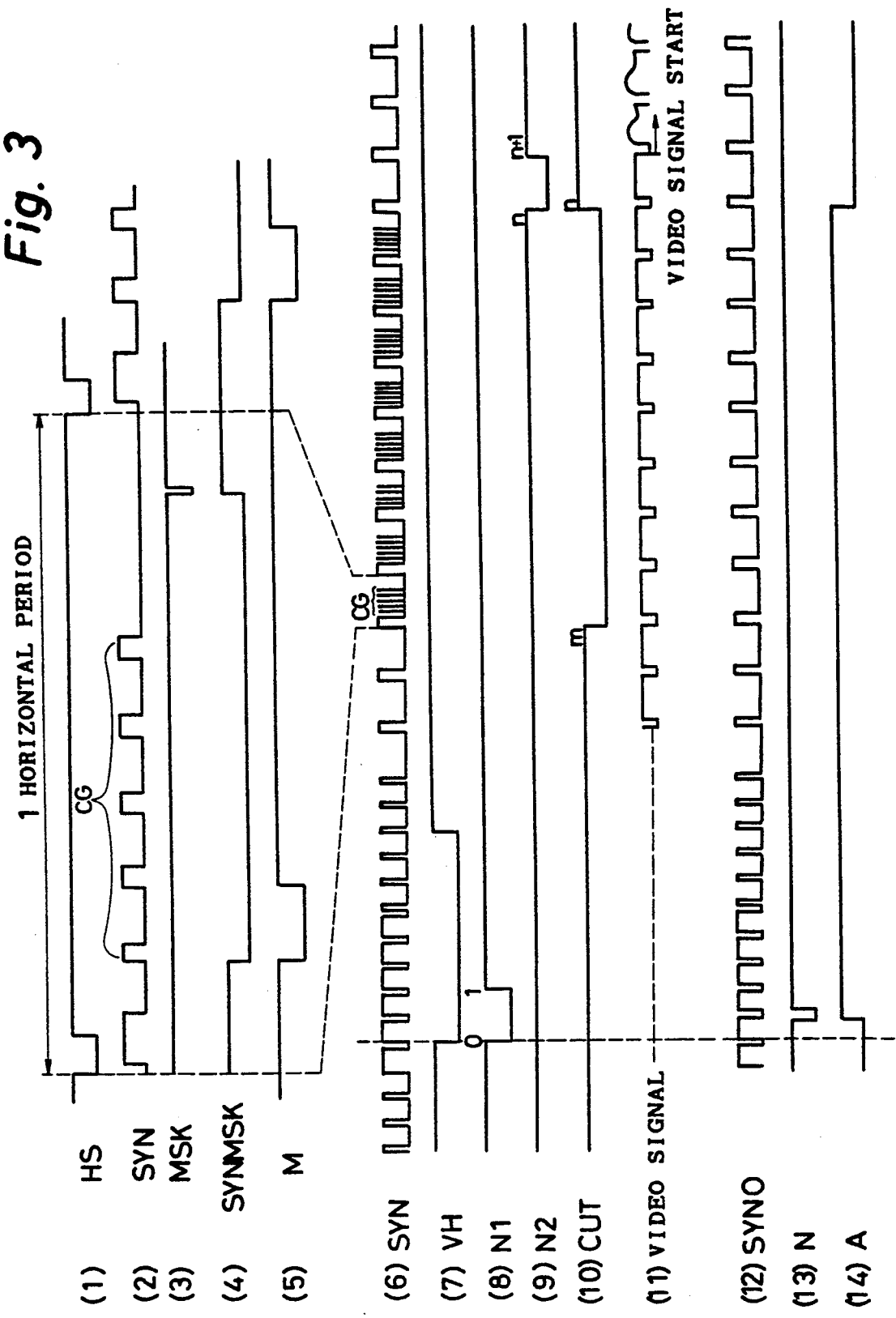
FIG. 3 is a timing chart showing the operation of the synchronizing circuit of the embodiment of FIG. 2.

FIG. 2 is a block diagram showing a schematic drawing of a synchronizing circuit for display in an embodiment of the invention. FIG. 3 is a timing chart showing the operation of the synchronizing circuit of FIG. 2.

In FIG. 2, a PLL circuit 1, a counter 2, a vertical synchronizing component separating circuit 3, and a vertical synchronizing signal generating circuit 4 are almost same as in the case of the conventional synchronizing circuit as described above. To the PLL circuit 1, however, a composite synchronizing signal SY passing thorough a changeover circuit 13 described below is fed. An untreated composite synchronizing signal SYN is directly fed to the vertical synchronizing component separating circuit 3 (same as in the prior art).

In other words, the PLL circuit 1 receives the composite synchronizing signal SY, and generates both a clock CK synchronized with the horizontal synchronizing component of the composite synchronizing signal, and a reset pulse RES for resetting the counter 2 (which is the first counter of the next stage).

The counter 2 is reset by the reset pulse RES and counts the clock CK. The counter 2 generates a horizontal synchronizing signal HS shown in FIG. 3 (1) synchronizing with the horizontal synchronizing component of the composite synchronizing signal SY, and a first pulse MSK shown in FIG. 3 (3) indicating a point after the end point of a copy guard signal CG added to the composite synchronizing signal SYN. The horizontal synchronizing signal HS is delivered to a terminal T2.

The vertical synchronizing component separating circuit 3 receives the composite synchronizing signal SYN, and generates a second pulse VS synchronized with the vertical synchronizing component in the composite synchronizing signal SYN.

The vertical synchronizing signal generating circuit 4 converts the pulse VS generated in the vertical synchronizing component separating circuit 3 into a vertical synchronizing signal VH synchronized with the horizontal synchronizing signal HS generated in the counter 2. The vertical synchronizing signal VH is delivered to a terminal T3.

An HS counter 5 (which is also known as a third counter) is automatically initialized by the vertical synchronizing signal VH when the vertical synchronizing signal VH is generated from the vertical synchronizing signal generating circuit 4, or in a period longer than the period when the vertical synchronizing signal VH is not generated. The counter 5 counts the horizontal synchronizing signal HS which is the output of the counter 2, and generates: (1) a fifth pulse N1 changing to low level in a period from count 0 to count 1 right after initialization as shown in FIG. 3 (8); (2) a seventh pulse N2 changing to low level in a period from count n to count n+1 after initialization as shown in FIG. 3 (9); and (3) a sixth pulse CUT changing to low level in a period from count m to count n after initialization as shown in FIG. 3(10).

In the composite synchronizing signal SYN shown in FIG. 3 (6), meanwhile, a copy guard signal CG is added in a period from count m to count n of the HS counter 5. The waveforms in FIG. 3(1) to FIG. 3(5) denote the wave forms in one horizontal period.

A gate circuit 6 delivers the composite synchronizing signal SYN directly as signal SCK while the pulse N1 is at low level, that is, in a period from count 0 to count 1 of the HS counter 5. In an ordinary television signal, only several pulses of composite synchronizing signal SYN are generated in this period, but when noise is present, many pulses are generated in this period. When the television signal is noisy, the signal containing so many pulses is delivered from the gate circuit 6 as the signal SCK.

A noise judging circuit 7 judges whether a normal composite synchronizing signal SYN is fed or noise is contained, on the basis of the output signal SCK from the gate circuit 6 of the previous stage. The noise judging circuit 7 is initialized by the horizontal synchronizing signal HS generated by the counter 2 and counts the output signal SCK from the gate circuit 6. The noise judging circuit 7 comprises a counter for delivering the pulse N shown in FIG. 3 (13) at the c-th count. This noise judging circuit 7 counts the output signal SCK of the gate circuit 6 for a period from count 0 to count 1 of the HS counter 5, and when the composite synchronizing signal SYN is noisy, the counting increases to reach count c, thereby delivering pulse N. That is, output of pulse N means that the noisy state is judged.

The latch circuit 8 is set by the pulse N delivered from the noise judging circuit 7, is reset by the pulse N2 from the HS counter 5, and delivers a pulse A becoming a high level in a period from the falling point of the pulse N till the falling point of the pulse N2 as shown in FIG. 3 (14). That is, the pulse A is delivered when the noise judging circuit 7 judges the noisy state.

An OR gate 9 calculates the logical sum of the pulse A delivered from the latch circuit 8 and the pulse CUT delivered from the HS counter 5, and delivers a pulse B as an OR signal. Therefore, in the case of a normal signal in which the composite synchronizing signal SYN is not noisy, the pulse CUT is delivered as the pulse B, and when noisy, a specific high level is delivered as the pulse B. That is, in the noisy state, the pulse CUT is invalidated by the pulse A.

A SYN counter 10 (which is also known as a second counter) is initialized by the pulse MSK generated by the counter 2. The SYN counter 10 counts the composite synchronizing signal SYN, and delivers a third pulse M as shown in FIG. 3 (5) which is changed to low level in a period from the second count to the third count of the counting. In this case, the pulse M is a signal indicating the start point of the copy guard signal CG added to the composite synchronizing signal SYN.

A latch circuit 11 is set by the pulse MSK generated by the counter 2, is reset by a pulse N delivered from the SYN counter 10, and delivers a fourth pulse SYNMSK changed to low level in a period from the falling point of the pulse M till the falling point of the pulse MSK as shown in FIG. 3 (4). In this case, the pulse SYNMSK is a signal for masking the copy guard signal CG added to the composite synchronizing signal SYN.

A gate circuit 12 receives a masked signal of the composite synchronizing signal SYN shown in FIG. 3 (5) by the pulse SYNMSK, that is, the masked composite synchronizing signal SYN shown in FIG. 3 (12) having the copy guard signal CG removed from the composite synchronizing signal SYN.

A changeover circuit 13 receives the composite synchronizing signal SYN and the masked composite synchronizing signal SYNO (obtained from the gate circuit 12 of the preceding stage), and selects either signal depending on the pulse B from the OR gate 9 as the composite synchronizing signal SY to be applied to the PLL circuit 1 mentioned above. That is, when the pulse B is the pulse CUT and the pulse CUT is at low level, the changeover circuit 12 selects the masked composite synchronizing signal SYNO, that is, the composite synchronizing signal being rid of the copy guard signal CG. When the pulse B is a signal of a specific high level invalidating the pulse CUT, the changeover circuit 13 select the unmasked original composite synchronizing signal SYN as the composite synchronizing signal SY.

Referring then to the timing chart in FIG. 3, the operation of this synchronizing circuit is explained below.

When a composite synchronizing signal SYN (having a copy guard signal CG added between horizontal synchronizing signals) is fed as the composite synchronizing signal as shown in FIG. 3 (2) and FIG. 3 (6), a vertical synchronizing signal VH as shown in FIG. 3 (7) is generated through the vertical synchronizing component separating circuit 3 and vertical synchronizing signal generating circuit 4.

On the other hand, in the SYN counter 10, being initialized by the pulse MSK generated by the counter 2, the composite synchronizing signal SYN is counted, and the pulse M as shown in FIG. 3 (S) is delivered.

In the next latch circuit 11, on the basis of the pulse M and pulse NSK from the counter 2, as pulse SYNMSK is delivered as the mask for removing the copy guard signal CG as shown in FIG. 3 (4).

In the gate circuit 12 of the next stage, masking the composite synchronizing signal SYN with this pulse SYNMSK, the masked composite synchronizing signal SYNO (with the copy guard signal CG removed) is delivered as shown in FIG. 3 (12).

In the changeover circuit 13 of the next stage, depending on the pulse B given from the OR gate 9, either the original composite synchronizing signal SYN or the masked composite synchronizing signal SYNO is selected as the composite synchronizing signal SY to be fed to the PLL circuit 1.

On the basis of the composite synchronizing signal SY fed into the PLL circuit 1, the pulses N1, N2, CUT as shown in FIG. 3 (8) to (10) are delivered from the HS counter 5. Delivery of these signals depends on the horizontal synchronizing signal HS shown in FIG. 3 (1), and the vertical synchronizing signal VH shown in FIG. 3 (7).

In the gate circuit 6, while the pulse N1 is at low level, the composite synchronizing signal SYN is passed, and is fed to the noise judging circuit 7 of the next stage as the signal SCK.

In the noise judging circuit 7, after initialization counted. When the composite synchronizing signal SYN is normal and not in noisy state, its counter does not reach count c, and pulse N (shown in FIG. 3 (13) is not delivered. That is, it is judged that noise is not present. By contrast, when the composite synchronizing signal SYN is in the noisy state, the counting reaches count c, and pulse N is delivered from the noise judging circuit 7. That is, it is judged that noise is present.

When the noise judging circuit 7 detects noise, on the basis of the pulse N delivered from the noise judging circuit 7 and the pulse N2 delivered from the HS counter 5, the latch circuit 8 generates a pulse A (shown in FIG. 3 (14)) thereby invalidating the pulse CUT.

When the composite synchronizing signal SYN is normal without noise, the pulse A is not delivered, and a pulse CUT is given to the changeover circuit 13 as a pulse B which is the output of the OR gate 9.

In the changeover circuit 13, therefore, for the composite synchronizing signal SY to be fed to the PLL circuit 1 (while the pulse B is at low level) the masked composite synchronizing signal SYNO (with the copy guard signal CG removed) is selected. While the pulse B is at high level, the composite synchronizing signal SYN is selected.

Thus, while the composite synchronizing signal SYN is not in noisy state, the composite synchronizing signal SY removing the copy guard signal CG is fed to the PLL circuit 1, and disturbance due to the copy guard signal CG does not occur in the horizontal synchronizing signal HS obtained therefrom.

On the other hand, when the composite synchronizing signal SYN is noisy, the pulse N is delivered from the noise judging circuit 7, and the latch circuit 8 generates the pulse A. Accordingly, the pulse CUT delivered from the HS counter is invalidated, and the pulse B applied from the OR gate 9 to the changeover circuit 13 becomes a constant high level. The changeover circuit 13 selects the original unmasked composite synchronizing signal SYN as the composite synchronizing signal SY to be fed to the PLL circuit 1.

Incidentally, if the composite synchronizing signal SYN is masked in the noisy state, when synchronized by receiving the composite synchronizing signal in the disturbed state of composite synchronizing signal due to noise, its leading-in speed is low. In the case of television signal of weak electric field with low intensity of electric wave, if the composite synchronizing signal SYN is masked, it is hard to synchronize.

In this embodiment, since masking of the composite synchronizing signal SYN is dependent on the presence or absence of noise, such delay in synchronization inducing speed or difficulty in synchronization may be avoided.

Besides, it is in the case of the reproduction of video tape that the composite synchronizing signal with the added copy guard signal CG must be handled, and this case is different from the condition of the noise state or weak electric field condition. Therefore, if the signal is masked, the delay in synchronization inducing speed or difficulty in synchronization does not occur.

In the foregoing embodiment, even if copy guard signal CG is not added to the composite synchronizing signal SYN, as far as not in noisy state, the masked composite synchronizing signal SYNO is selected as the composite synchronizing signal SY to be fed to the PLL circuit 1. There is no problem because, in this case, the masked composite synchronizing signal SYNO is identical with the unmasked original composite synchronizing signal SYN.

The invention may be embodied in other specific forms without departing from the spirit or essential characteristics therefore. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A synchronizing circuit for obtaining a horizontal synchronizing signal and a vertical synchronizing signal from a composite synchronizing signal, the composite synchronizing signal including therewith a specific signal, the specific signal having been added between horizontal synchronizing signals in the composite synchronizing signal, the synchronizing circuit comprising:

a mask circuit for masking the composite synchronizing signal in a specific period between horizontal synchronizing signals and obtaining a masked composite synchronizing signal, the masked composite synchronizing signal having the specific signal removed therefrom;

a judging circuit which determines whether a noise signal is contained in the composite synchronizing signal by counting signals in the composite synchronizing signal through a gate means and which compares a count of the counted signals with a predetermined count C; and, a discriminating circuit, responsive to the determination of the judging circuit, for determining whether the horizontal synchronizing signal and the vertical synchronizing signal are to be obtained from (1) the composite synchronizing signal, or (2) the masked composite synchronizing signal.

2. A synchronizing circuit according to claim 1, further comprising:

means for generating a horizontal synchronizing signal, the horizontal synchronizing signal generating means comprising a PLL circuit and a clock signal counter;

a vertical synchronizing component separating circuit for generating a vertical synchronizing signal;

wherein the PLL circuit uses a signal input thereto by the discriminating circuit to generate a clock signal and a reset pulse for resetting the clock signal counter;

wherein the clock signal counter counts pulses included in the clock signal to generate the horizontal synchronizing signal and a signal indicative of an end of an addition of the specific signal, the specific signal being a copy guard signal;

wherein the vertical synchronizing component separating circuit generates a pulse synchronized with the vertical synchronizing signal on the basis of the input composite synchronizing signal, and wherein the vertical synchronizing component separating circuit converts the pulse generated thereby into a vertical synchronizing signal synchronized with the horizontal synchronizing signal.

3. A synchronizing circuit according to claim 1, further comprising:

means for generating a horizontal synchronizing signal;

wherein the discriminating circuit applies one of (1) the composite synchronizing signal and (2) the masked opposite synchronizing signal as an input signal to the means for generating the horizontal synchronizing signal;

wherein the means for generating a horizontal synchronize signal comprises a clock signal counter which generates a clock count signal upon counting a predetermined number of signals included in the input signal applied thereto.

4. A synchronizing circuit according to claim 3, wherein the mask circuit includes:

a counter for counting the number of signals included in the composite television signal and for producing a signal when the number of signals counted reaches a predetermined number; and, latch means, controlled by the clock count signal generated by the clock signal counter, for using the signal produced by the counter included in the mask circuit to remove the specific signal from the composite synchronizing signal.

5. A synchronizing circuit according to claim 3, wherein the mask circuit further comprises:
- a mask circuit counter for counting signals included in the composite synchronizing signal, the counter being reset by the signal from the clock signal counter, the mask circuit counter generating a signal which changes in value when the mask circuit counter count is between the values two and three;
- a latch circuit for generating a latching signal which changes in value in a time period between a change in value of the signal of the mask circuit counter and a change in value of the clock count signal; and,
- a gate circuit for using the latching signal to generate the masked composite synchronization signal.

6. A synchronizing circuit according to claim 3, wherein the judging circuit comprises:
- a judging counter for counting the horizontal synchronizing signals which are output from the clock counter, and for generating the following pulses:
  (a) a pulse which is changed in value during a period wherein the judging counter counts from 0 to 1;
  (b) a pulse which is changed in value during a period wherein the judging counter counts from a number m to a number n, the number n being related to the last horizontal synchronizing signal and the number m being less than the number n; and,
  (c) a pulse which is changed in value during a period wherein the judging counter counts from n to n+1;
- a gate circuit for transmitting therethrough as gate circuit output the composite synchronizing signal when pulse (a) generated by the judging counter changes value;
- wherein the noise judging circuit counts signals included in the gate circuit output and generates a pulse when a predetermined number C of counts is reached;
- a latching circuit for generating a latch pulse which has a high value in a period from a change in value of the pulse from the noise judging circuit until a fall of the pulse (c) from the judging counter; and,
- an OR circuit for logically ORing the pulse (b) generated by the judging counter with the latch pulse.

7. A synchronizing circuit according to claim 6, wherein the discriminating circuit uses an output from the OR circuit to determine whether the horizontal synchronizing signal and the vertical synchronizing signal are to be obtained from (1) the composite synchronizing signal, or (2) the masked composite synchronizing signal.

* * * * *